US012473161B2

(12) United States Patent
Aoki et al.

(10) Patent No.: US 12,473,161 B2
(45) Date of Patent: Nov. 18, 2025

(54) SHEET CONVEYANCE APPARATUS AND IMAGE FORMING APPARATUS

(71) Applicant: CANON KABUSHIKI KAISHA, Tokyo (JP)

(72) Inventors: Kohei Aoki, Chiba (JP); Takahiro Kobayashi, Chiba (JP); Yoshiaki Hara, Chiba (JP); Shutaro Saito, Tokyo (JP); Hiroshi Kokubo, Tokyo (JP); Jun Kawakita, Chiba (JP); Yushi Sadamitsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 18/675,593

(22) Filed: May 28, 2024

(65) Prior Publication Data

US 2024/0409345 A1 Dec. 12, 2024

(30) Foreign Application Priority Data

Jun. 8, 2023 (JP) ................................ 2023-094607

(51) Int. Cl.

*B65H 5/02* (2006.01)
*B41J 29/02* (2006.01)
*G03G 21/16* (2006.01)

(52) U.S. Cl.

CPC .............. *B65H 5/023* (2013.01); *B41J 29/02* (2013.01); *G03G 21/1633* (2013.01); *B65H 2402/441* (2013.01); *B65H 2402/45* (2013.01); *B65H 2404/2614* (2013.01); *B65H 2404/2693* (2013.01); *B65H 2801/21* (2013.01)

(58) Field of Classification Search

CPC ............ B65H 5/023; B65H 2404/2614; B65H 2404/2615; B65H 5/026; B65H 2404/2693; B65H 2404/268; B65H 2404/2682; B65H 2801/21; B65H 2402/441; B41J 29/02; G03G 21/1633; G03G 2221/1615; B56H 2402/45

See application file for complete search history.

(56) References Cited

U.S. PATENT DOCUMENTS 4,563,077 A * 1/1986 Komada ............ G03G 21/1633 399/165
4,803,511 A * 2/1989 Izzo .................. G03G 21/1647 399/116
7,386,255 B2 * 6/2008 Ochi .................. G03G 21/1633 399/121

FOREIGN PATENT DOCUMENTS

JP 2020015290 A 1/2020

* cited by examiner

*Primary Examiner* — Jeremy R Severson

(74) *Attorney, Agent, or Firm* — ROSSI, KIMMS & McDOWELL LLP

(57) ABSTRACT

A sheet conveyance apparatus configured to convey a sheet includes a casing, a belt unit, an accommodating unit, a moving unit, and a rotary member. The accommodating unit and the belt unit move to a first state, a second state, and a third state. In the first state, the accommodating unit is positioned at a closed position and the belt unit is positioned at a first position to convey the sheet by a conveyance belt. In the second state, the accommodating unit is positioned at an opening position and the belt unit is positioned at the first position to open a sheet conveyance path. In the third state, the accommodating unit is positioned at the opening position and the belt unit is positioned at a second position to allow the conveyance belt to attach to and detach from the belt unit.

15 Claims, 9 Drawing Sheets

SHEET CONVEYANCE APPARATUS AND IMAGE FORMING APPARATUS

BACKGROUND OF THE INVENTION

Field of the Invention

This disclosure relates to a sheet conveyance apparatus that conveys a sheet, and an image forming apparatus including this sheet conveyance apparatus.

Description of the Related Art

A configuration that heats a sheet by a heater while nips and conveys the sheet by a pair of belts is described in Japanese Patent Laid-Open No. 2020-15290.

Here, in configurations of fixing function units, configurations that enable a sheet removal work from front sides of apparatuses are demanded so as to improve workability during sheet removal when a jam has occurred. For example, in cases where sheet conveyance paths are arranged substantially horizontally and other apparatuses are connected to the left and right, it is desirable that upper belts and lower belts of the fixing function units are configured to disengage from each other. In these cases, for example, in cases where work such as replacing belts of the upper belts is performed, so as to proceed with the work, it is necessary to access the upper belts from upper sides of upper doors by removing external and internal covers or by removing the upper doors themselves from apparatus bodies.

However, since the work of replacing the belts of the belt units described above involves complex disassembly to access the belts, or may require working at heights and handling heavy materials, the workability is poor.

The purpose of this disclosure is to provide a sheet conveyance apparatus and an image forming apparatus that can improve the workability during maintenance activities, such as the belt replacement.

SUMMARY OF THE INVENTION

According to a first aspect of the present invention, a sheet conveyance apparatus configured to convey a sheet includes a casing, a belt unit including a conveyance belt provided at the belt unit detachably and configured to convey the sheet, an accommodating unit configured to accommodate the belt unit, the accommodating unit including a pivot shaft provided along a sheet conveyance direction, the accommodating unit being configured to be moved to an opening position and a closed position by rotating with respect to the casing, a moving unit configured to move the belt unit with respect to the accommodating unit to a first position accommodated in the accommodating unit and a second position projecting from the accommodating unit, and a rotary member arranged to face the belt unit and configured to convey the sheet by nipping the sheet with the conveyance belt in a case where the accommodating unit is positioned at the closed position and the belt unit is positioned at the first position. The accommodating unit and the belt unit are configured to be moved to a first state, a second state, and a third state. In the first state, the accommodating unit is positioned at the closed position and the belt unit is positioned at the first position to convey the sheet by the conveyance belt. In the second state, the accommodating unit is positioned at the opening position and the belt unit is positioned at the first position to open a sheet conveyance path. In the third state, the accommodating unit is positioned at the opening position and the belt unit is positioned at the second position to allow the conveyance belt to attach to and detach from the belt unit.

According to a second aspect of the present invention, an image forming apparatus includes an image forming unit configured to form an image on a sheet by ejecting ink, and the sheet conveyance apparatus configured to convey the sheet on which the image has been formed by the image forming unit.

Further features of the present invention will become apparent from the following description of exemplary embodiments with reference to the attached drawings.

DESCRIPTION OF THE EMBODIMENTS

Using drawings, the present embodiment will be described. First, using FIG. 1, a schematic configuration of an image forming system of the present embodiment will be described.

Image Forming System

An inkjet recording system 100 of the present embodiment uses an inkjet recording method that forms an image on a sheet by ejecting ink, and is a so-called sheet-fed inkjet recording apparatus that forms an ink image on the sheet using a two-liquid system of reaction liquid and the ink. Any sheet, for example, paper such as regular paper and cardboard, a plastic film such as a sheet for an overhead projector, a sheet of a special shape such as an envelope and index paper, cloth, and the like is acceptable as long as the sheet is a recording material that can accept the ink.

Figure 1:
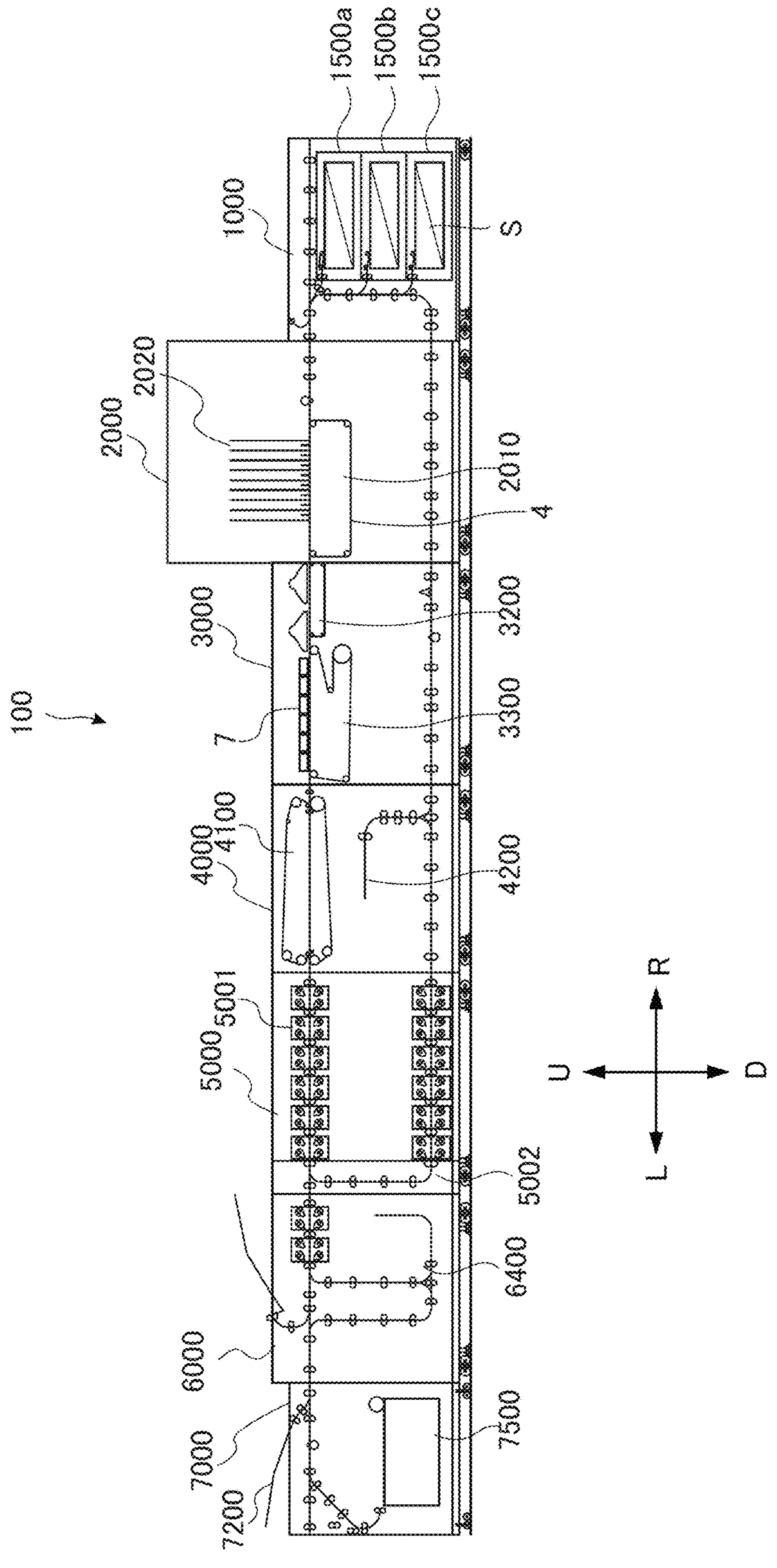
FIG. 1 is a cross-sectional view illustrating a schematic configuration of an image forming system of the present embodiment.

As illustrated in FIG. 1, the inkjet recording system 100 of the present embodiment is an example of an image forming apparatus, and includes a feed module 1000, a print module 2000, and a drying module 3000. Further, the inkjet recording system 100 includes a fixing module 4000, a cooling module 5000, a reverse module 6000, and a supporting module 7000. The sheet S supplied from the feed module 1000 undergoes various processing during a time when the sheet is conveyed along a sheet conveyance path inside of each module, and is finally discharged to the supporting module 7000.

To be noted, it is acceptable that, from the feed module 1000 to the supporting module 7000, the modules each include a distinct casing, and the inkjet recording system 100 is constituted by interconnecting these distinct casings. Alternatively, it is acceptable that the feed, print, drying, fixing, cooling, reverse, and supporting modules 1000, 2000, 300, 4000, 5000, 6000, and 7000 are arranged in a single casing.

The feed module 1000 includes storage compartments 1500*a*, 1500*b*, and 1500*c* that store the sheet S, and the storage compartments 1500*a* to 1500*c* are withdrawable toward a front side of the apparatus so as to store the sheet S inside. In each of the storage compartments 1500*a* to 1500*c*, the sheet S is fed by a separation belt and a conveyance roller, not shown, one sheet at a time, and is conveyed to the print module 2000. To be noted, the number of the storage compartments 1500*a* to 1500*c* is not limited to three, and the feed module 1000 may include one, or two, or equal to or more than four storage compartments.

The print module 2000 that is an example of an image forming unit includes a pre-image formation registration correction unit, not shown, a print belt unit 2010, and a recording unit 2020, and forms the image by ejecting the ink onto the sheet S. The pre-image formation registration correction unit corrects the skew and a position of the sheet S conveyed from the feed module 1000, and, thereafter, the sheet S is conveyed to the print belt unit 2010. The recording unit 2020 is located at a position facing the print belt unit 2010 with respect to a sheet conveyance path. The recording unit 2020 is an inkjet recording unit that forms the image on the sheet by ejecting the ink with respect to the conveyed sheet S through recording heads from above. A plurality of recording heads that eject the ink are arranged along a sheet conveyance direction. In the present embodiment, the recording unit 2020 includes total of five line-type recording heads which corresponds to four colors: yellow (Y), magenta (M), cyan (C), and black (K), and an additional head for the reaction liquid added to these four colors. The sheet S is adsorptively conveyed by the print belt unit 2010, and, thereby, clearance with the recording heads is ensured.

To be noted, the variety of colors and the number of the recording heads are not respectively limited to four and five described above. Methods using such as a heating element, a piezoelectric element, an electrostatic element, and a micro electromechanical system (MEMS) element can be adopted to an inkjet method. The ink of each color is supplied from an ink tank, not shown, to each of the recording heads through an ink tube. With respect to the total mass of the ink, the ink contains 0.1 mass % to 20.0 mass % of a resin component, water, water-soluble organic solvent, a colorant, wax, an additive, and the like.

During the time when the sheet is conveyed by the print belt unit 2010, the sheet S on which the image has been formed by the recording unit 2020 is detected by an inline scanner, not shown, arranged downstream of the recording unit 2020 in the sheet conveyance direction. Here, the misalignment and the color density of the image formed on the sheet S are detected, and, based on these misalignment and color density of the image, the correction of such as image formation and density are performed.

Figure 2:
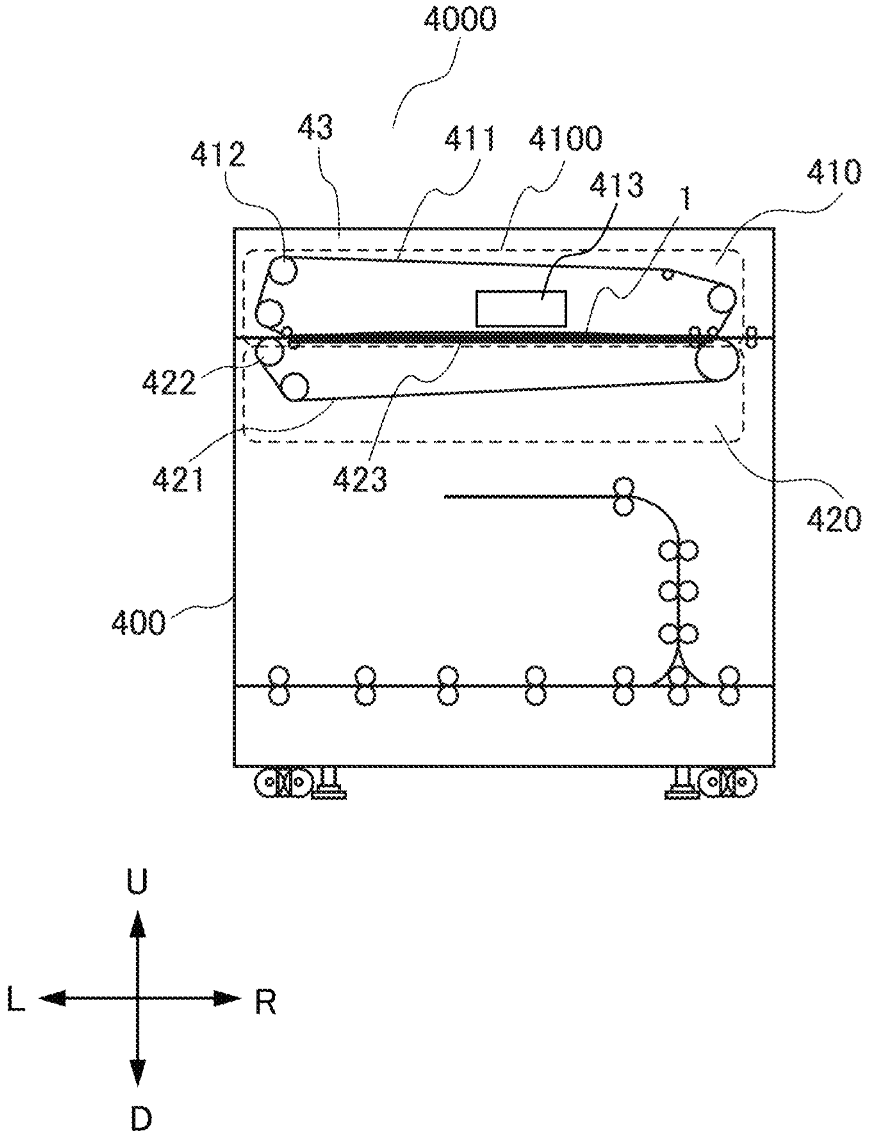
FIG. 2 is a cross-sectional view illustrating a schematic configuration of a fixing module of the present embodiment.

The drying module 3000 is an example of a drying apparatus, and dries the sheet S, on which the image has been formed through ink ejection, by blowing warm airflow onto the sheet S. As illustrated in FIG. 2, the drying module 3000 includes a decoupling portion 40, a drying belt unit 5, a warm air blowing unit 8. So as to facilitate the fixing of the ink on the sheet S by the subsequent fixing module 4000, the drying module 3000 reduces liquid contents in the ink and the reaction liquid applied to the sheet S. The sheet S on which the image has been formed is conveyed to the decoupling portion 40 arranged within the drying module 3000. In the decoupling portion 40, the sheet S is conveyed by a belt by generating a friction force between the sheet S and the belt through the pressure of airflow blown from above. Thereby, by conveying the sheet S placed on the belt through the friction force, the displacement of the sheet S is prevented during conveyance across the print belt unit 2010 and the decoupling portion 40. The sheet S conveyed from the decoupling portion 40 is adsorptively conveyed by the drying belt unit 5, and the ink and the reaction liquid applied to the sheet S are dried by blowing the warm airflow from the warm air blowing unit 8 arranged above the belt.

Thus, by promoting the evaporation of moisture through heating the ink and the reaction liquid applied to the sheet S with the drying module 3000, it is possible to suppress the occurrence of so-called cockling, where ink splashes onto the sheet S and creates an outline-like line around the sheet S. To be noted, as for the heater for warming the air, for example, heating methods, such as electric resistant wires and infrared heaters are preferable in view of safety and energy efficiency. Further, the drying method may be configured by combining not only a method that applies the warm air but also a method that irradiates the surface of the sheet S with electromagnetic waves (such as ultraviolet and infrared rays), and a conduction heat transfer method through contact with a heating element.

As illustrated in FIG. 1, the fixing module 4000 includes a fixing belt unit 4100. The fixing belt unit 4100 fixes the ink on the sheet S by passing the sheet S, which has been conveyed from the drying module 3000 and bears the printed image, through a heated upper belt unit and a lower belt unit. The fixing belt unit 4100 will be described in detail below.

The cooling module 5000 includes a plurality of cooling units 5001, and cools a high temperature sheet S, which has been conveyed from the fixing module 4000, by the cooling units 5001. The cooling unit 5001, for example, increases pressure in an interior of a cooling box by drawing exterior air into the interior of the cooling box through a fan. Then, utilizing this pressure, the air is expelled from the cooling box through nozzles, which are directed onto the sheet S to cool the sheet S. The cooling units 5001 are arranged on both sides with respect to the sheet conveyance path, and cool both surfaces of the sheet S.

A conveyance path switching portion 5002 is disposed in the cooling module 5000. The conveyance path switching portion 5002 switches the sheet conveyance path depending on whether the sheet S is conveyed to the reverse module 6000 or to duplex conveyance paths used during duplex printing in which the image is formed on both the surfaces of the sheet S.

The reverse module 6000 includes a reverse portion 6400. The reverse portion 6400 reverses the front and back surfaces of the sheet S discharged to the supporting module 7000 by reversing the front and back surfaces of the sheet S that is conveyed. The supporting module 7000 includes a top tray 7200 and a supporting portion 7500, and stacks the sheet S conveyed from the reverse module 6000.

During the duplex printing, the sheet S is conveyed through a sheet conveyance path located in a lower section of the cooling module 5000 by the conveyance path switching portion 5002. Thereafter, the sheet S is returned to the print module 2000 by passing through duplex conveyance paths of the fixing, drying, print, and feed modules 4000, 3000, 2000, and 1000. A reverse portion 4200 reversing the front and back surfaces of the sheet S is disposed in a duplex conveyance unit of the fixing module 4000. The image is formed also on an unprinted other surface of the sheet S that has been returned to the print module 2000, and the sheet S is discharged from the drying module 3000 to the supporting module 7000 via the reverse module 6000.

Fixing Module

Using FIGS. 2 to 9, the fixing module 4000 will be described in detail. In the present embodiment, the fixing module 4000 is an example of a sheet conveyance apparatus that conveys the sheet. FIG. 2 is a schematic diagram illustrating the fixing module 4000. The fixing belt unit 4100 is disposed on an upper part of the fixing module 4000. The fixing belt unit 4100 includes a substantially linear sheet conveyance path 1 that is used to receive the sheet S discharged from the drying module 3000 and transfers the sheet S to the cooling module 5000 after having performed the fixing. To be noted, in each figure, a front side of the inkjet recording system 100 is denoted as a front side F, a back side as a back side B, a side on the right as a right side R, a side on the left as a left side L, an upper side as an upward side U, and a lower side as a downward side D. Further, an operation unit, not shown, which is operated by an operator is disposed on the front side of the inkjet recording system 100.

The fixing belt unit 4100 includes the upper belt unit 410 and the lower belt unit 420. The upper belt unit 410 is arranged on the upward side U with respect to the lower belt unit 420 in a vertical direction. The upper belt unit 410 includes an upper belt 411 that is an example of a fixing belt and a conveyance belt (first conveyance belt), and stretching rollers 412 providing tension to the upper belt 411. That is, the upper belt unit 410 is an example of a belt unit (first belt unit), and detachably includes the upper belt 411 that conveys the sheet S. The lower belt unit 420 is an example of a second belt unit, and includes a lower belt 421, stretching rollers 422 providing tension to the lower belt 421, and a pad 423 having an arc-shaped curved surface. The pad 423 is arranged to form a nip with the upper belt 411 through the lower belt 421.

The sheet S is nipped and conveyed by the nip between the upper and lower belt units 410 and 420. That is, the lower belt 421 is an example of a rotary member and a second conveyance belt, and is arranged to face the upper belt unit 410 when an upper door unit 43 and the upper belt unit 410 are respectively positioned at a closed position and an upper storage position (refer to FIG. 2). Further, at this time, the lower belt 421 conveys the sheet S by nipping the sheet S with the upper belt 411. Nip pressure is determined by the tension and the thickness of the upper belt 411 and the curvature of the pad 423. If the nip pressure is too high, there is a risk that the ink from the sheet S will adhere to the upper belt unit 410, and the ink will be peeled off from the sheet S. Therefore, the nip pressure is preferably in a range of 1 pascal (Pa) to 2000 Pa, and more preferably within 1 Pa to 200 Pa.

When the curvature of the pad 423 becomes large, a difference in sheet conveyance paths on the front and back sides of the sheet S increases. Thereby, there is a risk of generating friction between the sheet S and the belt. When the curvature of the pad 423 becomes large, there is a risk that the sheet S itself will memorize a curved shape and start curling. Therefore, it is preferable that a radius of the curvature of the pad 423 is equal to or larger than 50 millimeters (mm). Further, from the standpoint of manufacturing precision, the radius of the curvature of the pad 423 is preferably equal to or less than 100,000 mm. In the present embodiment, under these constraints, the tension of the upper belt 411 is set at 200 newtons (N), thickness at 0.3 mm, the radius of the curvature of the pad 423 at 30,000 mm, and the nip pressure at approximately 16 Pa.

By adopting the configuration described above, uniform pressurization is enabled even with a wide nip. Thereby, even in a state in which a temperature of the upper belt unit 410 is set to a melting point of the wax or a boiling point of the water, it is possible to ensure a sufficient heat transfer to the sheet S by increasing a contact time between the sheet S and the upper belt unit 410. However, if the nip is maintained after the heat has been transferred sufficiently, the ink may adhere to the upper belt 411 and peel off from the sheet S, or the friction between the upper belt 411 and the sheet S may cause image distortion. Therefore, an excessively long contact time is undesirable. Therefore, the desired duration of time for a leading edge of the sheet S to enter an inlet of the nip and exit an exit of the nip is between 0.5 seconds(s) to 4 s. In the present embodiment, the pad 423 with a length of 900 mm in the sheet conveyance direction is used, and the sheet S is conveyed at a speed of 700 mm/s, so that the duration of the time for the leading edge of the sheet S to enter the inlet of the nip and pass through the exit of the nip is set at approximately 1.3 s. To be noted, since moisture is necessary at a time when the ink penetrates into the sheet S, when the sheet becomes a high temperature, it is preferable for the upper and lower belts 411 and 421 to be impermeable to the moisture so as to prevent a water vapor, which has evaporated from the surface of the sheet S, from escaping through contact with either the upper belt 411 or the lower belt 421.

As described above, in the present embodiment, the fixing module 4000 is an example of a fixing unit, and includes a heater 413 in the upper belt unit 410. The fixing module 4000 fixes the image on the sheet S by heating and pressing the sheet S between the upper and lower belts 411 and 421.

Jam Processing

In a case where sheet clogging (jam) or a conveyance slip has occurred in the sheet conveyance path 1 and conveyance timing has deviated from predetermined timing, the apparatus detects the jam. In this case, while an automatic discharge of the sheet S remaining within the sheet conveyance path 1 to a purge tray is performed, in a case where the remaining sheet cannot be discharged to the purge tray, it is necessary for a user to remove the remaining sheet. While the sheet S is conveyed by being nipped at the nip of the upper and lower belt units 410 and 420, in a case where the sheet S remains at the nip when the jam has occurred, the user opens the nip, and removes the remaining sheet.

Figure 3:
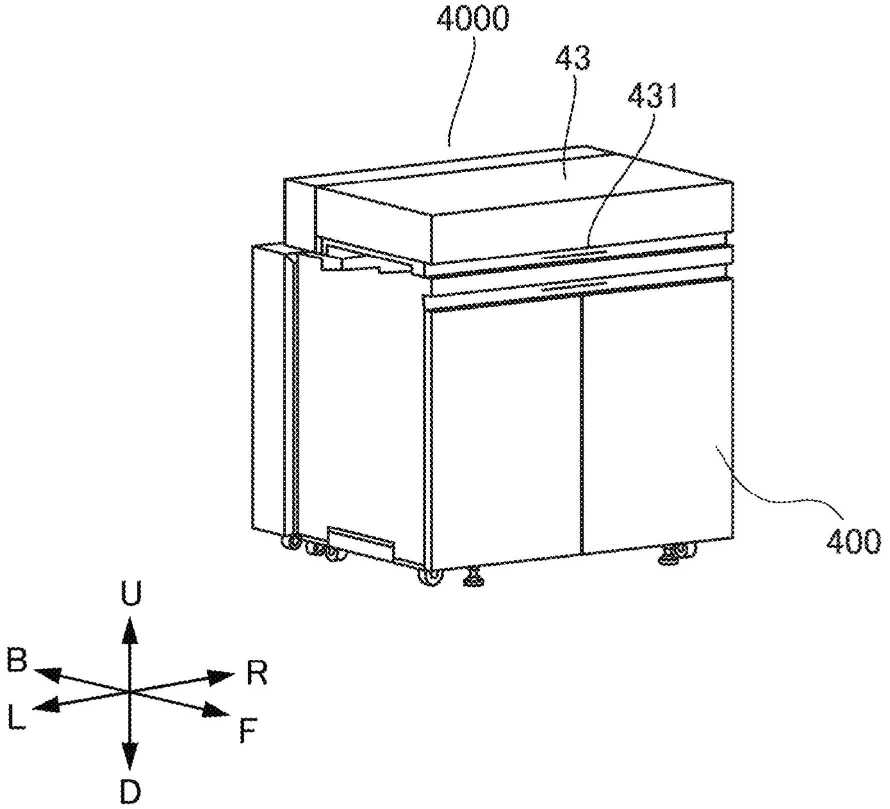
FIG. 3 is a perspective view illustrating a first state in which an upper door unit of the fixing module of the present embodiment is positioned at a closed position.
Figure 4:
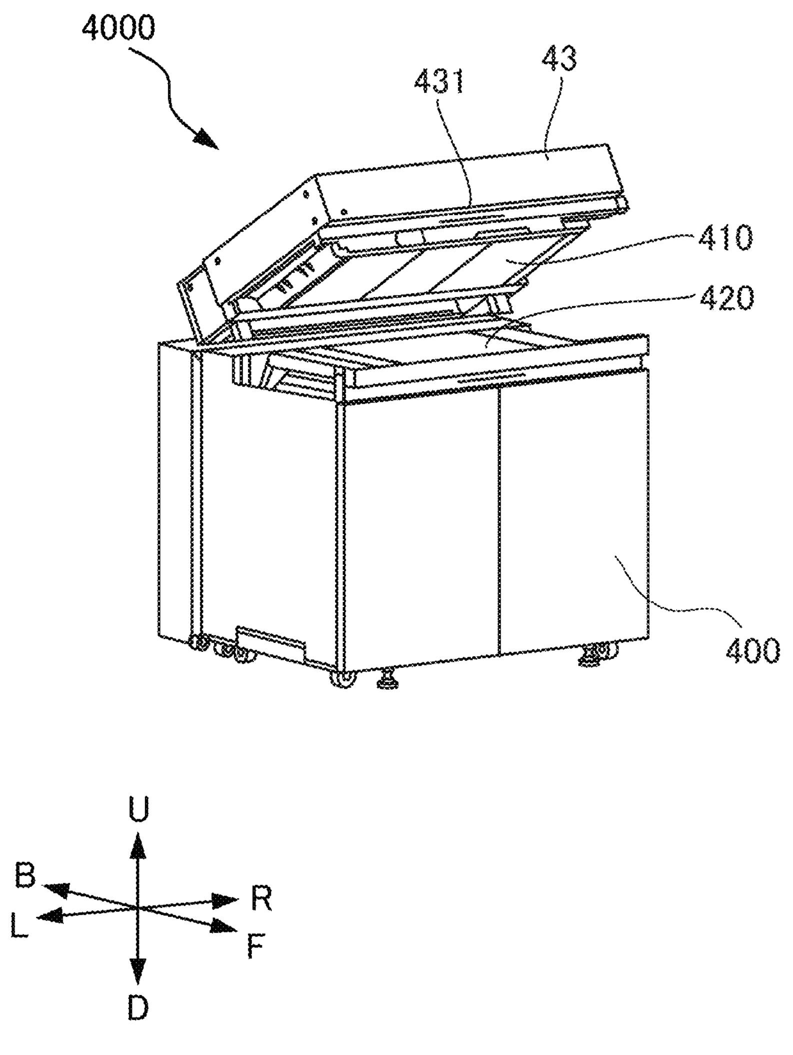
FIG. 4 is a perspective view illustrating a second state in which the upper door unit of the fixing module of the present embodiment is positioned at an opening position and an upper belt unit is positioned at an upper storage position.
Figure 5:
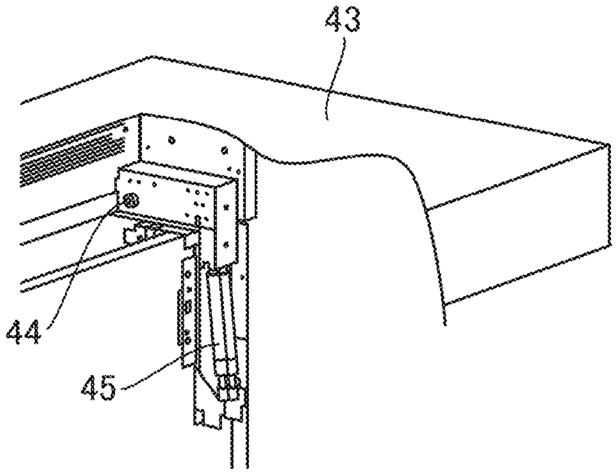
FIG. 5 is a perspective view illustrating a gas spring that is in a state in which the upper door unit of the fixing module of the present embodiment is positioned at the closed position.

As illustrated in FIGS. 3 to 5, the fixing module 4000 includes an upper door unit 43 that is openable upward. The upper belt unit 410 of the fixing belt unit 4100 is arranged inside of the upper door unit 43, and the upper door unit 43 is openable upward integrally with the upper belt unit 410. The upper door unit 43 is pivotably connected with respect to an apparatus body 400 by a support shaft 44 (refer to FIG. 5) disposed on the back side B of the apparatus body 400, serving as an example of a casing. The support shaft 44 is an example of a pivot shaft and a first pivot shaft. The support shaft 44 is disposed on a back surface side of the apparatus body 400 with respect to a sheet width direction (front-back direction) intersecting with the sheet conveyance direction, and is disposed along the sheet conveyance direction. The upper door unit 43 is pivotably disposed with respect to the apparatus body 400 around the support shaft 44 as a center.

The upper door unit 43 includes a handle 431 on the front side F of the apparatus body 400, and pivots to open when the handle 431 is lifted upward. The upper door unit 43 is an example of an accommodating unit, and is disposed independently from the upper belt unit 410. The upper door unit 43 can store the upper belt unit 410, and, by pivoting with respect to the apparatus body 400, can be moved to the closed position (refer to FIG. 3) and an opening position (refer to FIGS. 4 and 6). Further, in the present embodiment, the upper door unit 43 is constituted from a top plate and side plates, and possesses a function as an upper cover of the apparatus body 400. To be noted, the upper door unit 43 is not limited to a unit that merely functions as a cover, and may also be integrated with such as, for example, a display unit and the operation unit.

In a case where the jam has occurred, by lifting the handle 431 of the upper door unit 43, it becomes possible for the user to open the upper door unit 43 upward and remove the sheet S remaining within an interior of the apparatus body 400 from the front of the apparatus. In the present embodiment, a gas spring 45 is disposed to improve operability at the time of opening and closing the upper door unit 43 by the user. The gas spring 45 is an example of a second urging member, and urges the upper door unit 43 toward the closed position.

In the present embodiment, the upper door unit 43 is capable of pivoting between the closed position, which is horizontal, and the opening position, which is inclined at 30 degrees from horizontal. The gas spring 45 urges the upper door unit 43 by a first urging force that allows the upper door unit 43 to pivot to the closed position by the own weight of the upper door unit 43 and the upper belt unit 410 in a case where an opening angle of the upper door unit 43 with respect to the horizontal direction is equal to less than a first angle. Here, the first angle is, for example, 5 degrees. Further, the gas spring 45 urges the upper door unit 43 by a second urging force that pivots the upper door unit 43 to the opening position in a case where the opening angle of the upper door unit 43 with respect to the horizontal direction is equal to more than a second angle. Here, the second angle is, for example, 20 degrees. Thereby, by disposing the gas spring 45, the operability is improved such that the upper door unit is automatically closed in a case where the opening angle of the upper door unit 43 is equal to or less than 5 degrees, and is automatically opened in a case of equal to or more than 20 degrees.

Parts Replacement Work of Upper Belt Unit

In the upper belt unit 410 of the fixing belt unit 4100, components such as the upper belt 411, the plurality of stretching rollers 412, a roller drive unit, not shown, the heater 413, serving as an example of a heating unit, and a sensor, not shown, are disposed. These components possess a risk of failure during a product lifecycle, and, so as to address replacement required for scheduled maintenance and accidental malfunctions, it is demanded that these components are replaceable at a location where the fixing module 4000 is installed. In commercial printing markets, since a product utilization rate is one of utmost importance to the user, it is desirable that replacement works are executed promptly and reliably.

Figure 6:
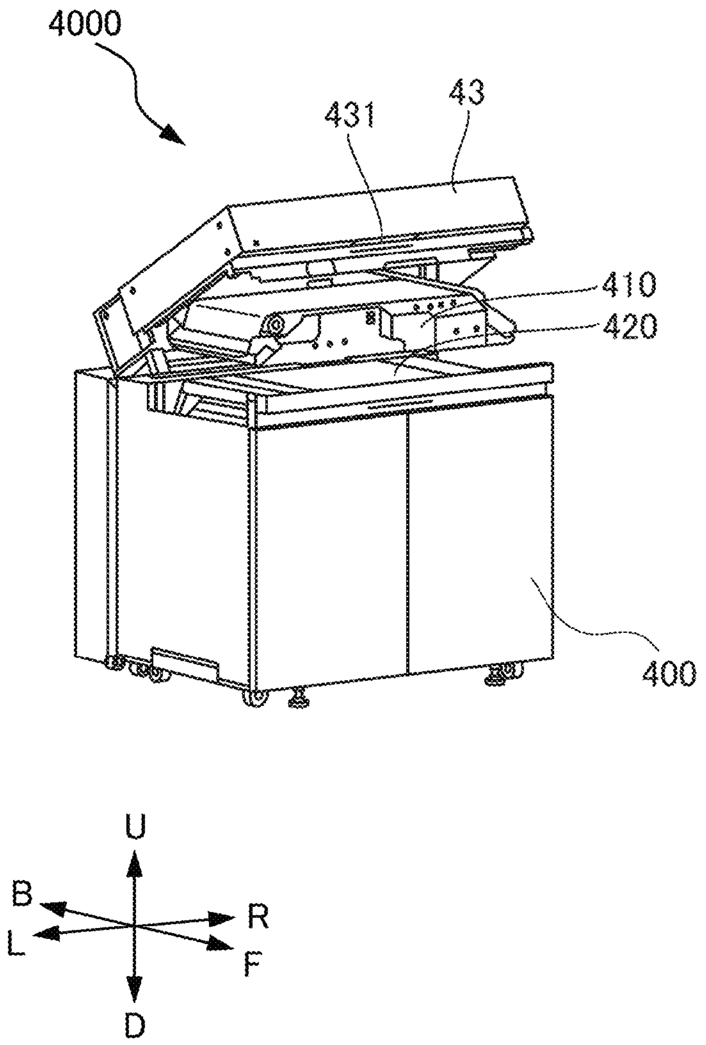
FIG. 6 is a perspective view illustrating a third state in which the upper door unit of the fixing module of the present embodiment is positioned at the opening position and the upper belt unit is positioned at a maintenance position.
Figure 7A:
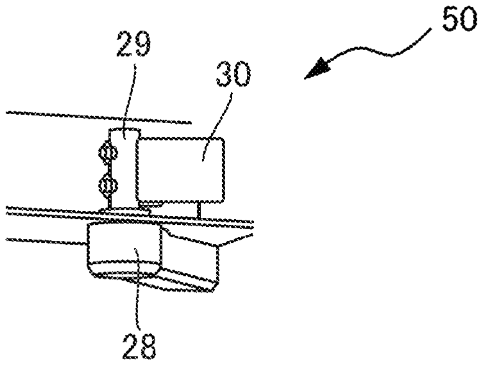
FIG. 7A is a perspective view illustrating a lock mechanism of the fixing module of the present embodiment.
Figure 7B:
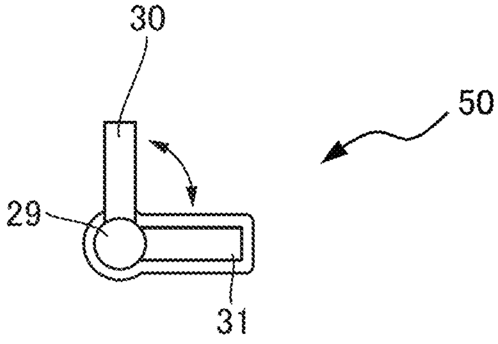
FIG. 7B is a bottom view illustrating the lock mechanism of the fixing module of the present embodiment.

Therefore, to the present embodiment, a configuration that enables the parts replacement of the upper belt unit 410 with the upper door unit 43 opened upward is adopted, and will be described using FIGS. 6 to 8. In a case of performing work such as the part replacement, cleaning, or lubrication, by lifting the handle 431 arranged on the front side F of the upper door unit 43 upward, the user pivots the upper door unit 43 upward, and opens the sheet conveyance path 1. The upper door unit 43 is held at the opening position by a holding member, not shown (refer to FIG. 4).

Figure 8:
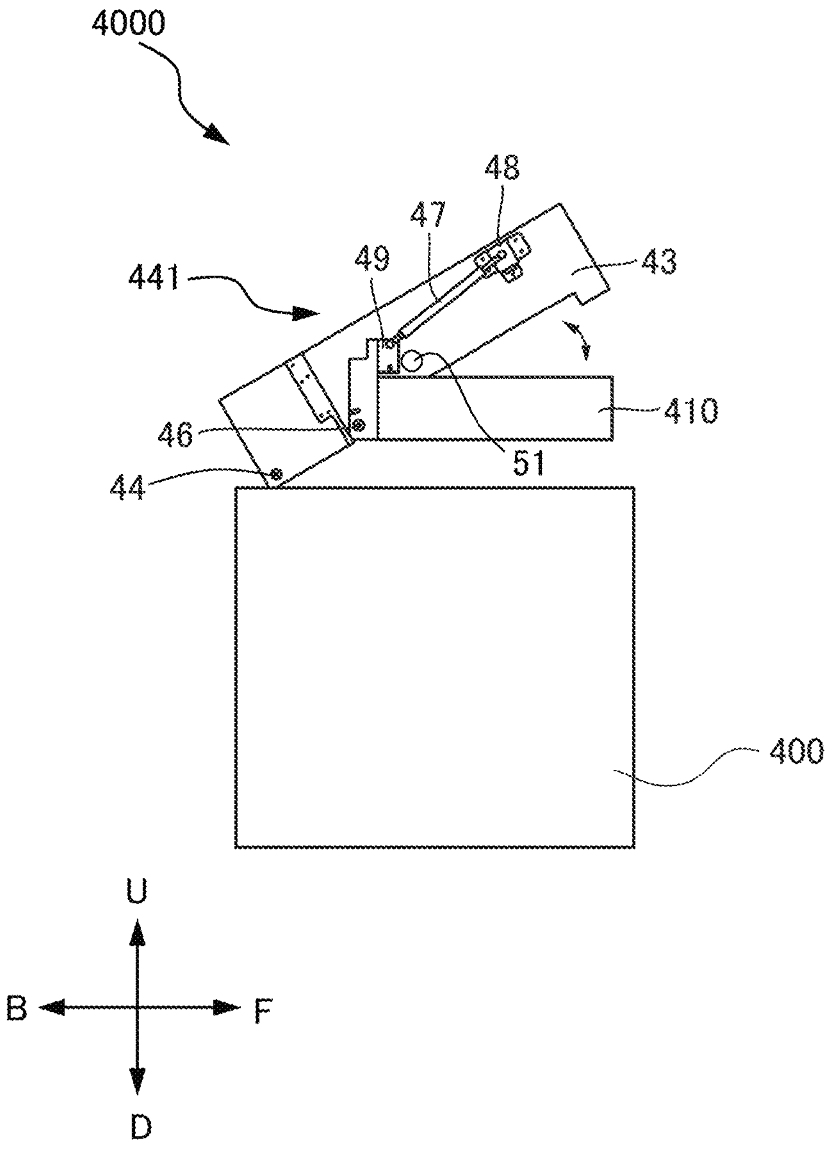
FIG. 8 is a side cross-sectional view illustrating the third state of the fixing module of the present embodiment.

As illustrated in FIG. 8, the fixing module 4000 includes a first moving unit 441, serving as a moving unit. The first moving unit 441 is disposed so as to move the upper belt unit 410 with respect to the upper door unit 43 to an upper storage position (refer to FIG. 4) stored in the upper door unit 43 and a maintenance position (refer to FIGS. 6 and 8) projecting from the upper door unit 43. Here, the upper storage position is an example of a first position, and the maintenance position is an example of a second position. The first moving unit 441 includes a pivot shaft 46, serving as an example of a second pivot shaft, a stopper 51, serving as an example of a holding portion, and a gas spring 47, serving as an example of a first urging member.

The pivot shaft 46 is disposed on a back surface side of the upper door unit 43 when positioned at the closed position with respect to the sheet width direction (front-back direction), and is disposed along the sheet conveyance direction. The upper belt unit 410 is pivotably disposed around the pivot shaft 46 as a center. The upper belt unit 410 arranged within the interior of the upper door unit 43 is pivotably supported with respect to the upper door unit 43 by the pivot shaft 46 disposed on the back side B of the upper door unit 43. The upper belt unit 410 is secured with respect to the upper door unit 43 by a lock mechanism 50 (refer to FIGS. 7A and 7B) arranged on the front side of the upper door unit 43.

A configuration of the lock mechanism 50 will be described. The lock mechanism 50 includes a lock lever 28, a pivot shaft 29, a lock member 30, and a lock hole 31. The lock lever 28 is rotatable around the pivot shaft 29 within a predetermined angle, and the lock member 30 is secured to the pivot shaft 29. With the rotation of the lock lever 28, the pivot shaft 29 can pivot the lock member 30 from a lock position to a lock releasing position. The lock hole 31 into which the pivot shaft 29 is inserted is formed on the upper door unit 43. The lock hole 31 is shaped to allow the lock member 30 positioned at a lock releasing angle to pass through, and it becomes possible to release the lock at this position.

When the lock is released by turning the lock lever 28 of the lock mechanism 50 with the upper door unit 43 opened upward, the upper belt unit 410 pivots around the pivot shaft 46 as a center, and the front side of the upper belt unit 410 pivots downward by the own weight of the upper belt unit 410. As described above, the lock mechanism 50 switches between the lock state, where the upper belt unit 410 is secured with respect to the upper door unit 43 at the upper storage position, and the lock releasing state, where, by releasing the lock state, the upper belt unit 410 is allowed to pivot from the upper storage position to the maintenance position.

The fastening member 49 of the upper belt unit 410 abuts against the stopper 51, which is disposed within the upper door unit 43, and a pivot of the upper belt unit 410 is stopped at the maintenance position. That is, the stopper 51 holds the upper belt unit 410 at the maintenance position when the upper door unit 43 is positioned at the opening position. The upper belt 411 is withdrawable to the front side of apparatus body 400 in the sheet width direction in a state in which the upper door unit 43 and the upper belt unit 410 are respectively positioned at the opening and maintenance positions. The worker can perform the replacement and maintenance of the upper belt 411 in this state.

While the upper belt unit 410 positioned at the maintenance position is preferably positioned at substantially the horizontal position, a slightly inclined position is also acceptable. However, if the upper belt unit 410 is inclined more than, for example, 10 degrees toward the upward side U with respect to the horizontal direction, the parts replacement becomes the work that is performed at heights, and the workability is reduced. On the other hand, if the upper belt unit 410 is inclined more than, for example, 10 degrees toward the downward side D with respect to the horizontal direction, during the parts replacement, it is necessary to be cautious so as not to fall a component, such as the upper belt 411 that has been removed, toward a side of the worker, and the workability is reduced. Therefore, the upper belt unit 410 is preferably arranged such that the inclination of the front side of the upper belt unit 410 remains confined to an angle of ±10 degrees with respect to the horizontal plane. That is, an inclination angle of the front side of the upper belt unit 410 with respect to the horizontal plane is set to be within ±10 degrees.

As illustrated in FIG. 8, the gas spring 47 is disposed between the upper door unit 43 and the upper belt unit 410. The gas spring 47 is an example of the first urging member, and urges the upper belt unit 410 toward the upper storage position with respect to the upper door unit 43 that is positioned at the opening position. Especially, in a case where the weight of the upper belt unit is heavy, it is possible to improve the operability by disposing the gas spring 47.

In the present embodiment, the gas spring 47 is arranged above the upper belt unit 410, and assists the opening and closing operation of the upper belt unit 410 by being fastened to a fastening member 48 within the upper door unit 43 and a fastening member 49 within the upper belt unit 410. In the present embodiment, since the gas spring 47 is arranged above the upper belt unit 410, the replacement work is not obstructed when performing the parts replacement with the upper belt unit 410 opened. Further, an urging force of the gas spring 47 is set such that the upper belt unit 410 is not freely lifted due to a change in weight during the removal of the component. Further, so as not to close the upper door unit 43 in a posture in which the upper belt unit 410 is being opened, the upper door unit 43 is held (locked) by a holding member, not shown.

The upper door unit 43 and the upper belt unit 410 described above are capable of moving into a first state, a second state, and a third state. The first state is a state in which the upper door unit 43 is positioned at the closed position, and the upper belt unit 410 is positioned at the upper storage position. In the first state, the sheet S is conveyed by the upper belt 411 (refer to FIG. 3). The second state is a state in which the upper door unit 43 is positioned at the opening position, and the upper belt unit 410 is positioned at the upper storage position. In the second state, the sheet conveyance path is opened (refer to FIG. 4). The third state is a state in which the upper door unit 43 is positioned at the opening position, and the upper belt unit 410 is positioned at the maintenance position. In the third state, the attachment and detachment of the upper belt 411 with respect to the upper belt unit 410 are allowed (refer to FIG. 6).

As described above, the upper belt unit 410 is held substantially at the horizontal position in the third state, and it becomes possible to perform the replacement of components such as the upper belt 411, the stretching rollers 412, the heater 413, and the sensor, as well as cleaning and lubrication work. Thereby, the removal of such as the upper door and an exterior cover becomes unnecessary, and it is possible to improve maintainability.

Parts Replacement Work of Lower Belt Unit

Figure 9:
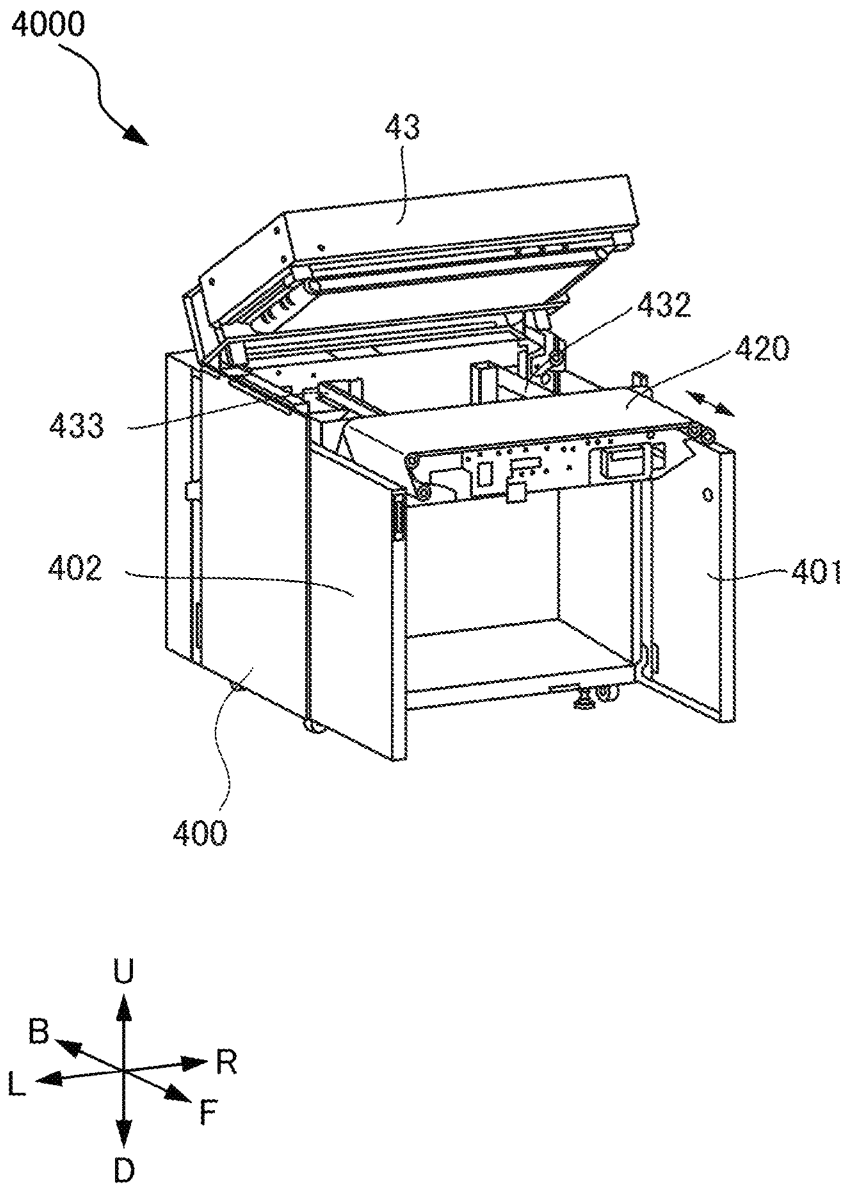
FIG. 9 is a perspective view illustrating a state in which a lower belt unit is positioned at a drawn-out position when the fixing module of the present embodiment is in the third state.

Next, using FIG. 9, the parts replacement and the maintenance of the lower belt unit 420 will be described. The upper door unit 43 is positioned at the opening position, and double front doors 401 and 402 on the front side of the fixing module 4000 are opened. A securing member, not shown, that secures the lower belt unit 420 is removed, and the lower belt unit 420 is drawn out toward the front side. Thereby, the lower belt unit 429 that is supported by slide rails 432 and 433 with a longitudinal direction being the front-back direction is drawn out. In this drawn-out state, it is possible to perform work such as the parts replacement, cleaning, and lubrication of the lower belt unit 420.

In the present embodiment, the slide rails 432 and 433 are examples of a second moving unit, and move the lower belt unit 420 with respect to the apparatus body 400 to a lower storage position stored in the apparatus body 400 and a drawn-out position projecting from the apparatus body 400. Here, the lower storage position is an example of a third position, and the drawn-out position is an example of a fourth position. Also, the drawn-out position is a position at which the lower belt unit 420 is pulled out from the apparatus body 400 toward the front side F with respect to the sheet width direction. At the drawn-out position, the attachment and detachment of the lower belt 421 with respect to the lower belt unit 420 are allowed. When the upper door unit 43 is positioned at the opening position, the lower belt unit 420 is allowed to move from the lower storage position to the drawn-out position.

As described above, according to the fixing module 4000 of the present embodiment, the upper door unit 43 and the upper belt unit 410 can move to the third state in which the upper door unit 43 and the upper belt unit 410 are respectively positioned at the opening position and the maintenance position. Thereby, the attachment and detachment of the upper belt 411 with respect to the upper belt unit 410 are allowed. In this state, it becomes possible to perform the replacement of components such as the upper belt 411, the stretching rollers 412, the heater 413, and the sensor, as well as cleaning and lubrication work. Further, the removal of such as the upper door and the exterior cover becomes unnecessary, and it is possible to improve the maintainability. Therefore, it is possible to improve the workability during the time of the maintenance, such as the time of the belt replacement. Further, according to the fixing module 4000 of the present embodiment, since the upper belt unit is held substantially at the horizontal position, it is possible to further improve the workability.

Further, according to the fixing module 4000 of the present embodiment, by drawing out the lower belt unit 420 toward the front side in a front direction, the attachment and detachment of the lower belt 421 with respect to the lower belt unit 420 are allowed. Thereby, it is possible to improve the workability during the time of the maintenance, such as the time of the belt replacement.

While, in the embodiment described above, the lower belt unit 420 is disposed in a manner that is withdrawable to the front side with a posture maintained horizontal, it is not limited to this. For example, it is acceptable to configure such that a case-shaped lower door unit that stores the lower belt unit 420 is pivotably disposed inside of the apparatus body 400, and, by tilting the front side of this lower door unit downward, the lower belt unit 420 is allowed to be lifted to the horizontal position. That is, it is acceptable to arrange the upper door unit 43 and the upper belt unit 410 on opposite sides of the lower door unit and the lower belt unit 420 in a substantially symmetrical manner across a sheet conveyance surface.

This configuration will be described in detail. A back surface side of the lower door unit is pivotably supported with respect to the apparatus body 400. In a case where the work such as the parts replacement, cleaning, and lubrication of the lower belt unit 420 is performed, by pulling downward a handle arranged on a front surface side of the lower door unit, the lower door unit is pivoted downward, and, thereby, the sheet conveyance path is opened. The lower belt unit 420 that is arranged within an interior of the lower door unit is pivotably supported by a pivot shaft disposed on the back surface side of the lower door unit. By releasing a lock of a lock member securing the lower belt unit 420 to the lower door unit and, then, by lifting the lower belt unit 420 by a hand, the front side of the lower belt unit 420 pivots upward. The lower belt unit 420 abuts against a stopper disposed within the lower door unit, and the pivot of the lower belt unit 420 is stopped. At this time, the lower belt unit is held substantially at the horizontal position or in a posture in which the front side is inclined about ±10 degrees, and, in this state, it becomes possible to perform the replacement of components such as the lower belt 421, the stretching rollers, the heater, and the sensor, as well as the cleaning and lubrication work.

Further, while, in the embodiment described above, this disclosure is applied to the fixing module 4000, serving as the sheet conveyance apparatus, it is not limited to this, and it is possible to apply this disclosure to an apparatus that includes a conveyance belt and a rotary member on each side across the sheet conveyance surface respectively. For example, this disclosure can be also applied to the cooling module 5000 (cooling apparatus).

Further, while, in the embodiment described above, this disclosure is applied to the inkjet recording system 100, serving as the image forming apparatus, it is not limited to this. For example, this disclosure can be applied to an image forming apparatus of an electrophotographic system using toner, and an equivalent outcome can be attained as with the present embodiment.

According to this disclosure, it is possible to improve the workability during the time of the maintenance, such as the time of the belt replacement.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-094607, filed Jun. 8, 2023 which is hereby incorporated by reference herein in its entirety.

What is claimed is:

1. A sheet conveyance apparatus configured to convey a sheet comprising:

a casing;

a belt unit including a conveyance belt provided at the belt unit detachably and configured to convey the sheet;

an accommodating unit configured to accommodate the belt unit, the accommodating unit including a pivot shaft provided along a sheet conveyance direction, the accommodating unit being configured to be moved to an opening position and a closed position by rotating with respect to the casing;

a moving unit configured to move the belt unit with respect to the accommodating unit to a first position accommodated in the accommodating unit and a second position projecting from the accommodating unit; and a rotary member arranged to face the belt unit and configured to convey the sheet by nipping the sheet with the conveyance belt in a case where the accommodating unit is positioned at the closed position and the belt unit is positioned at the first position, wherein the accommodating unit and the belt unit are configured to be moved to a first state, a second state, and a third state, wherein, in the first state, the accommodating unit is positioned at the closed position and the belt unit is positioned at the first position to convey the sheet by the conveyance belt, wherein, in the second state, the accommodating unit is positioned at the opening position and the belt unit is positioned at the first position to open a sheet conveyance path, and wherein, in the third state, the accommodating unit is positioned at the opening position and the belt unit is positioned at the second position to allow the conveyance belt to attach to and detach from the belt unit.

2. The sheet conveyance apparatus according to claim 1, wherein the belt unit is arranged upward in a vertical direction with respect to the rotary member, and wherein the accommodating unit is configured to be opened upward.

3. The sheet conveyance apparatus according to claim 2, wherein the conveyance belt is a first conveyance belt, wherein the belt unit is a first belt unit, wherein the moving unit is a first moving unit, wherein the rotary member is a second conveyance belt, wherein the sheet conveyance apparatus further comprises a second belt unit and a second moving unit, wherein the second belt unit includes the second conveyance belt, wherein the second moving unit is configured to move the second belt unit with respect to the casing to a third position and a fourth position, wherein, at the third position, the second belt unit is configured to be accommodated in the casing, wherein, at the fourth position, the second belt unit is configured to be pulled out in a front direction with respect to the casing to allow the second conveyance belt to attach to and detach from the second belt unit, and wherein, in a case where the accommodating unit is positioned at the opening position, the second belt unit is configured to be allowed to move from the third position to the fourth position.

4. The sheet conveyance apparatus according to claim 1, wherein the pivot shaft is disposed on a back side of the casing, and wherein the accommodating unit is pivotably disposed with respect to the casing around the pivot shaft as a center.

5. The sheet conveyance apparatus according to claim 4, wherein a sheet width direction intersecting with the sheet conveyance direction is a front-back direction with respect to the casing.

6. The sheet conveyance apparatus according to claim 5, wherein, in the third state, the conveyance belt is configured to be pulled out in a front direction with respect to the casing.

7. The sheet conveyance apparatus according to claim 6, wherein, in the third state, an inclination angle of a front side of the belt unit with respect to a horizontal plane is set to be within ±10 degrees.

8. The sheet conveyance apparatus according to claim 7, wherein, in the third state, the belt unit is positioned at a horizontal position.

9. The sheet conveyance apparatus according to claim 4,
wherein the pivot shaft is a first pivot shaft,
wherein the moving unit includes a second pivot shaft and a holding portion,
wherein the second pivot shaft is provided in the accommodating unit along the sheet conveyance direction,
wherein the belt unit is configured to be moved to the first position and the second position by pivoting around the second pivot shaft as a center, and
wherein the holding portion is configured to hold the belt unit at the second position in a case where the accommodating unit is positioned at the opening position.

10. The sheet conveyance apparatus according to claim 9, wherein the second pivot shaft is disposed on a back side of the accommodating unit.

11. The sheet conveyance apparatus according to claim 1, wherein the moving unit includes a first urging member configured to urge the belt unit toward the first position with respect to the accommodating unit positioned at the opening position.

12. The sheet conveyance apparatus according to claim 1, further comprising:

a lock mechanism configured to switch between a lock state securing the belt unit at the first position with respect to the accommodating unit, and a releasing state allowing the belt unit to pivot from the first position to the second position by releasing the lock state.

13. The sheet conveyance apparatus according to claim 1, further comprising:
a second urging member configured to urge the accommodating unit toward the opening position,
wherein the second urging member is configured to urge the accommodating unit by a first urging force that allows the accommodating unit to pivot toward the closed position by own weight of the accommodating unit and the belt unit in a case where an opening angle of the accommodating unit with respect to a horizontal direction is equal to or less than a first angle, and
wherein the second urging member is configured to urge the accommodating unit by a second urging force that pivots the accommodating unit toward the opening position in a case where the opening angle of the accommodating unit with respect to the horizontal direction is equal to or more than a second angle.

14. An image forming apparatus comprising:
an image forming unit configured to form an image on a sheet by ejecting ink; and
the sheet conveyance apparatus according to claim 1 configured to convey the sheet on which the image has been formed by the image forming unit.

15. The image forming apparatus according to claim 14,
wherein the sheet conveyance apparatus is a fixing unit, and
wherein the fixing unit includes a heating unit in the belt unit, and is configured to fix the image on the sheet by heating the sheet, on which the image has been formed, between the conveyance belt and the rotary member.

* * * * *